United States Patent
Zappi et al.

(10) Patent No.: US 9,820,232 B2
(45) Date of Patent: Nov. 14, 2017

(54) POWER DELAY PROFILE BASED INDOOR OUTDOOR DETECTION

(71) Applicant: QUALCOMM Incorporated, San Diego, CA (US)

(72) Inventors: Piero Zappi, San Diego, CA (US); Ashwin Swaminathan, San Diego, CA (US); Santiago Mazuelas, San Diego, CA (US); Roy Franklin Quick, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/151,348

(22) Filed: May 10, 2016

(65) Prior Publication Data
US 2016/0337978 A1 Nov. 17, 2016

Related U.S. Application Data

(60) Provisional application No. 62/160,487, filed on May 12, 2015.

(51) Int. Cl.
H04L 25/02 (2006.01)
H04W 52/02 (2009.01)
H04W 4/02 (2009.01)

(52) U.S. Cl.
CPC ..... *H04W 52/0258* (2013.01); *H04L 25/0212* (2013.01); *H04L 25/0222* (2013.01);
(Continued)

(58) Field of Classification Search
CPC ......... H04W 52/0258; H04W 52/0254; H04M 4/02; H04M 2250/10; H04M 2250/12;
(Continued)

(56) References Cited

U.S. PATENT DOCUMENTS

| 5,852,630 A | 12/1998 | Langberg et al. |
| 7,099,640 B2 | 8/2006 | Diao et al. |

(Continued)

FOREIGN PATENT DOCUMENTS

| EP | 2234354 A1 | 9/2010 |
| WO | WO-2004091143 A2 | 10/2004 |

(Continued)

OTHER PUBLICATIONS

International Search Report and Written Opinion—PCT/US2016/031835—ISA/EPO—dated Jul. 18, 2016.
(Continued)

*Primary Examiner* — Siu Lee
(74) *Attorney, Agent, or Firm* — Silicon Valley Patent Group LLP

(57) ABSTRACT

A detector in a mobile device receives input from a modem, determines whether the mobile device is indoor or outdoor based on the modem-supplied input, and stores in memory a binary value to indicate an indoor-outdoor state. In some embodiments, the detector extracts a feature from the modem-supplied input, and uses the extracted feature with a statistical classifier, to output an indoor-outdoor state and an associated probability of correctness of the indoor-outdoor state, in other embodiments, the detector determines whether the mobile device is indoor or outdoor based at least on the feature extracted to characterize temporal distribution of the wireless signal, by using a prior value of the state being indoor or outdoor.

26 Claims, 12 Drawing Sheets

(52) U.S. Cl.
CPC ......... *H04W 4/02* (2013.01); *H04W 52/0254* (2013.01); *H04M 2250/10* (2013.01); *H04M 2250/12* (2013.01); *Y02B 60/50* (2013.01)

(58) Field of Classification Search
CPC .. H04L 25/0212; H04L 25/0222; Y02B 60/50
USPC .......................... 375/259, 260, 316, 340, 342
See application file for complete search history.

(56) References Cited

U.S. PATENT DOCUMENTS

| | | | |
|---|---|---|---|
| 8,532,676 | B1 | 9/2013 | El-Sallabi |
| 8,903,325 | B2* | 12/2014 | Yin ...................... H04B 17/009 455/115.1 |
| 2004/0204026 | A1* | 10/2004 | Steer ...................... H04W 4/04 455/550.1 |
| 2007/0041432 | A1* | 2/2007 | Reial .................... H04B 1/7113 375/148 |
| 2007/0070879 | A1* | 3/2007 | Yoshida .................. H04L 5/023 370/208 |
| 2008/0260008 | A1 | 10/2008 | Vrcelj et al. |
| 2009/0245333 | A1 | 10/2009 | Krishnamoorthi et al. |
| 2010/0017126 | A1 | 1/2010 | Holcman et al. |
| 2012/0052872 | A1* | 3/2012 | Do ............................ G01S 5/18 455/456.1 |
| 2013/0237245 | A1 | 9/2013 | Tinnakornsrisuphap et al. |
| 2014/0016677 | A1 | 1/2014 | Dua et al. |
| 2014/0099971 | A1 | 4/2014 | Lim et al. |
| 2014/0114568 | A1 | 4/2014 | Park |
| 2014/0155085 | A1 | 6/2014 | Kosseifi et al. |
| 2014/0179298 | A1 | 6/2014 | Grokop et al. |
| 2014/0247206 | A1 | 9/2014 | Grokop et al. |
| 2015/0282112 | A1 | 10/2015 | Bialer et al. |

FOREIGN PATENT DOCUMENTS

| | | |
|---|---|---|
| WO | 2014113882 | 7/2014 |
| WO | 2014193373 A1 | 12/2014 |

OTHER PUBLICATIONS

Rappaport et al. "900-MHz Multipath Propagation Measurements for U.S. Digital Cellular Radiotelephone," May 1990, pp. 132-139, IEEE Transactions on Vehicular Technology, vol. 39, No. 2.

Rappaport et al. "Characterization of UHF Multipath Radio Channels in Factory Buildings," Aug. 1989, pp. 1058-1069, IEEE Transaction on Antennas and Propagation, vol. 37, No. 8.

Ganesh et al. "Statistics of short time and spatial variations measured in wideband indoor radio channels," Aug. 1993, IEE Proceedings of Microwaves, Antennas and Propagation, vol. 140, No. 4, pp. 297-302.

Zhou et al. "IODetector: A Generic Service for Indoor Outdoor Detection," 2012, In Proceedings of the 10th ACM Conference on Embedded Network Sensor Systems (SenSys '12). ACM, New York, NY, USA, pp. 113-126.

Radu et al. "Poster: Am I Indoor or Outdoor?," 2014. In Proceedings of the 20th annual international conference on Mobile computing and networking (MobiCom '14). ACM, New York, NY, USA, pp. 401-403.

Lipowezky, "Indoor-Outdoor Detector for Mobile Phone Cameras Using Gentle Boosting," Jun. 2010. In IEEE Computer Society Conference on Computer Vision and Pattern Recognition Workshops (CVPRW), pp. 31-38.

Han, Slides from course ECE6331 Spring 2009 (class 8), Advanced Telecommunication, Department of Electrical and Computer Engineering, University of Houston. pp. 1-41.

Ramjee, "Context-Aware Mobile Information Access," keynote talk, Infovision 2009 conference, http://research.microsoft.com/en-us/people/ramjee/infovision09.pdf, obtained on May 10, 2016. pp. 1-38.

Katz, "CS 294-7: Radio Propagation," CS Division, Univeristy of California, Berkeley, 1996, pp. 1-20.

* cited by examiner

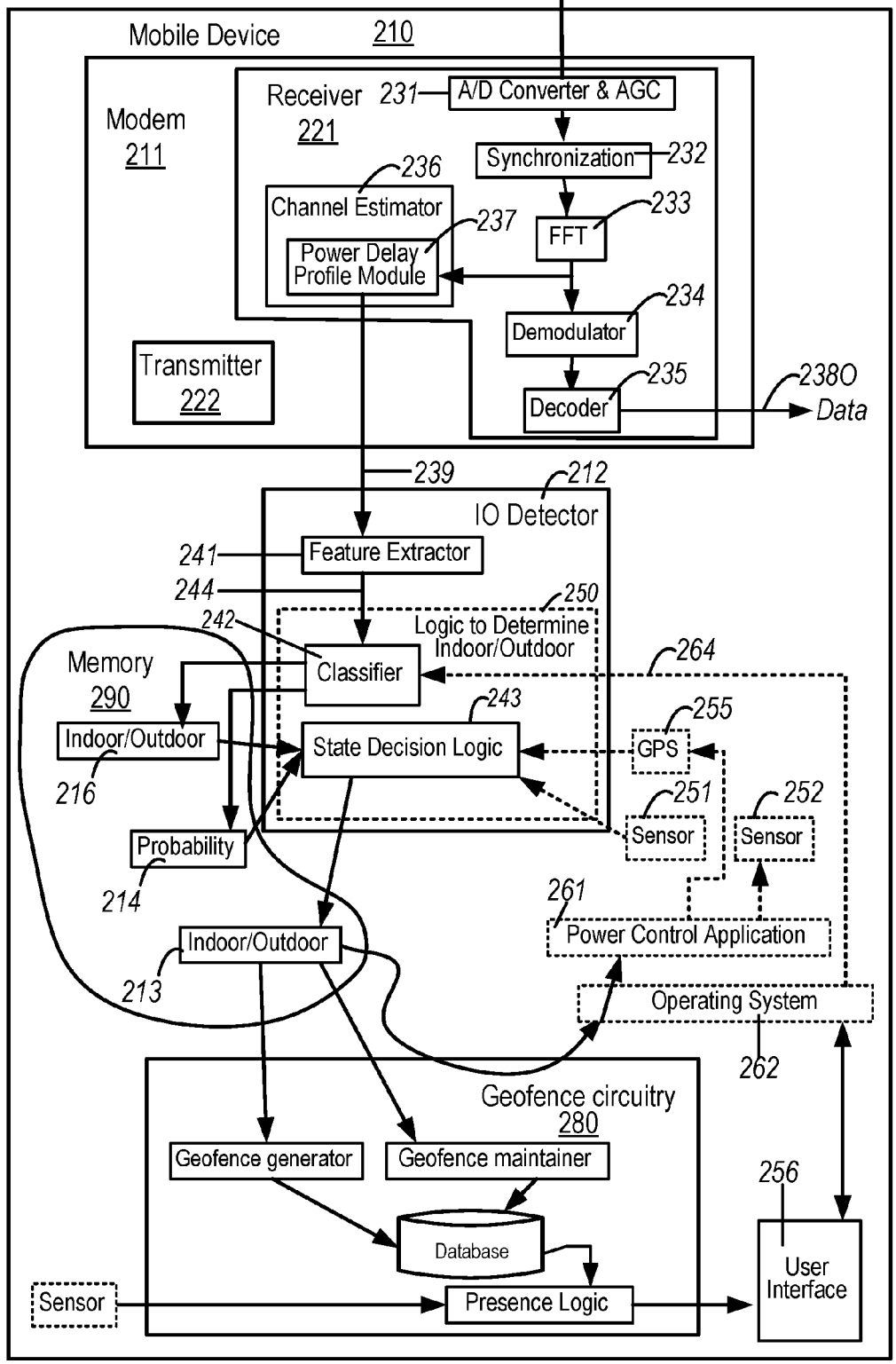

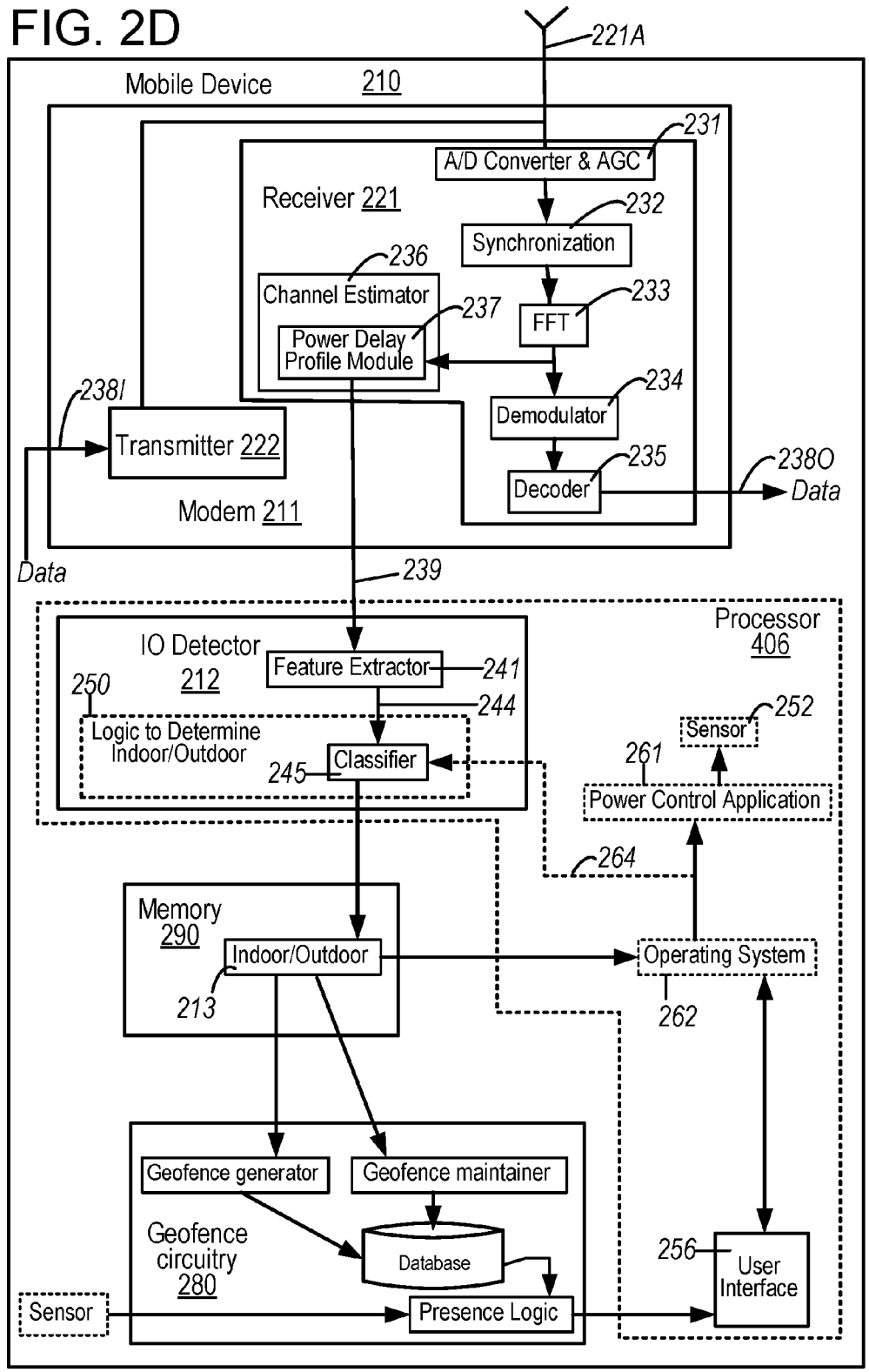

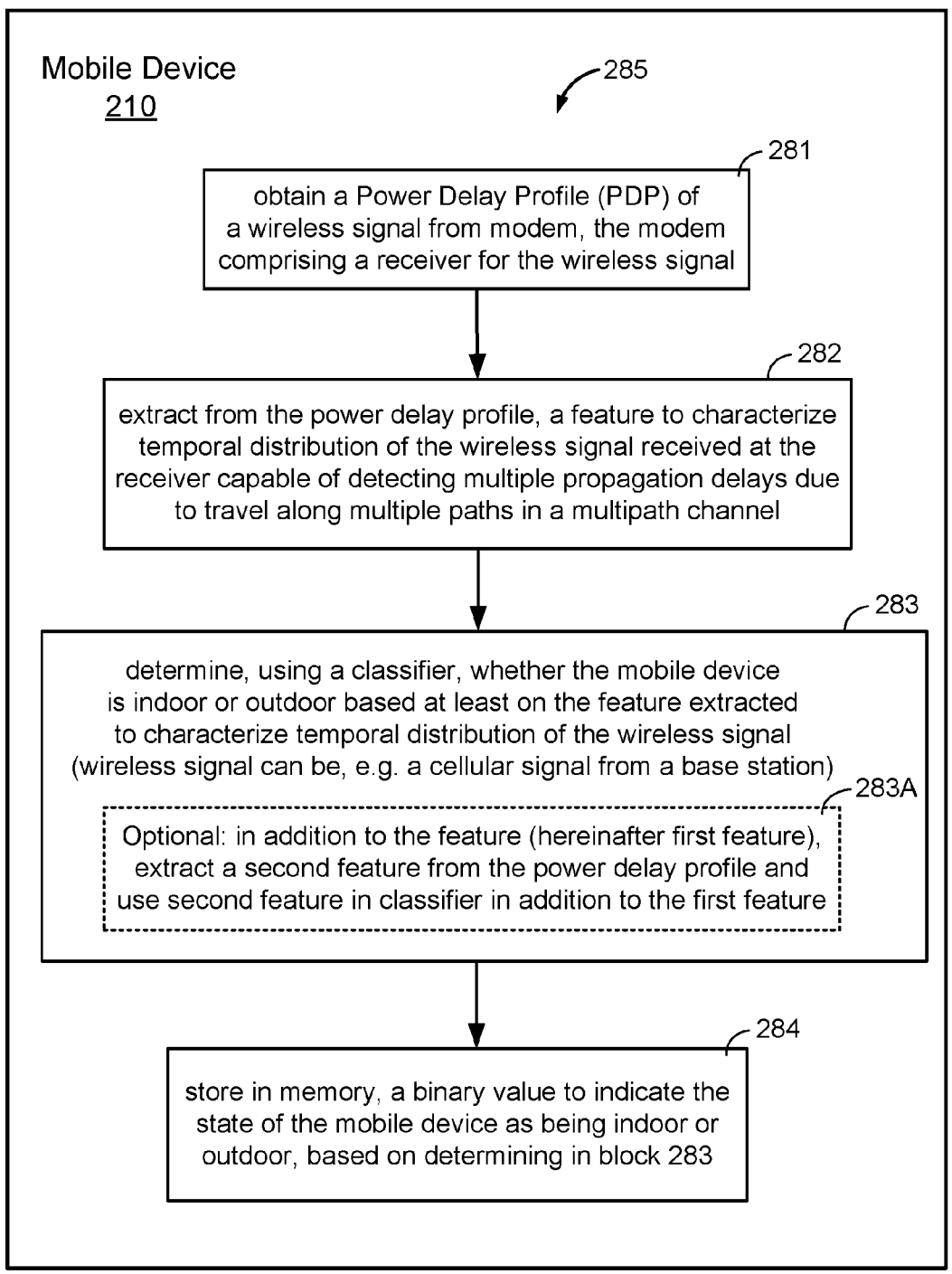

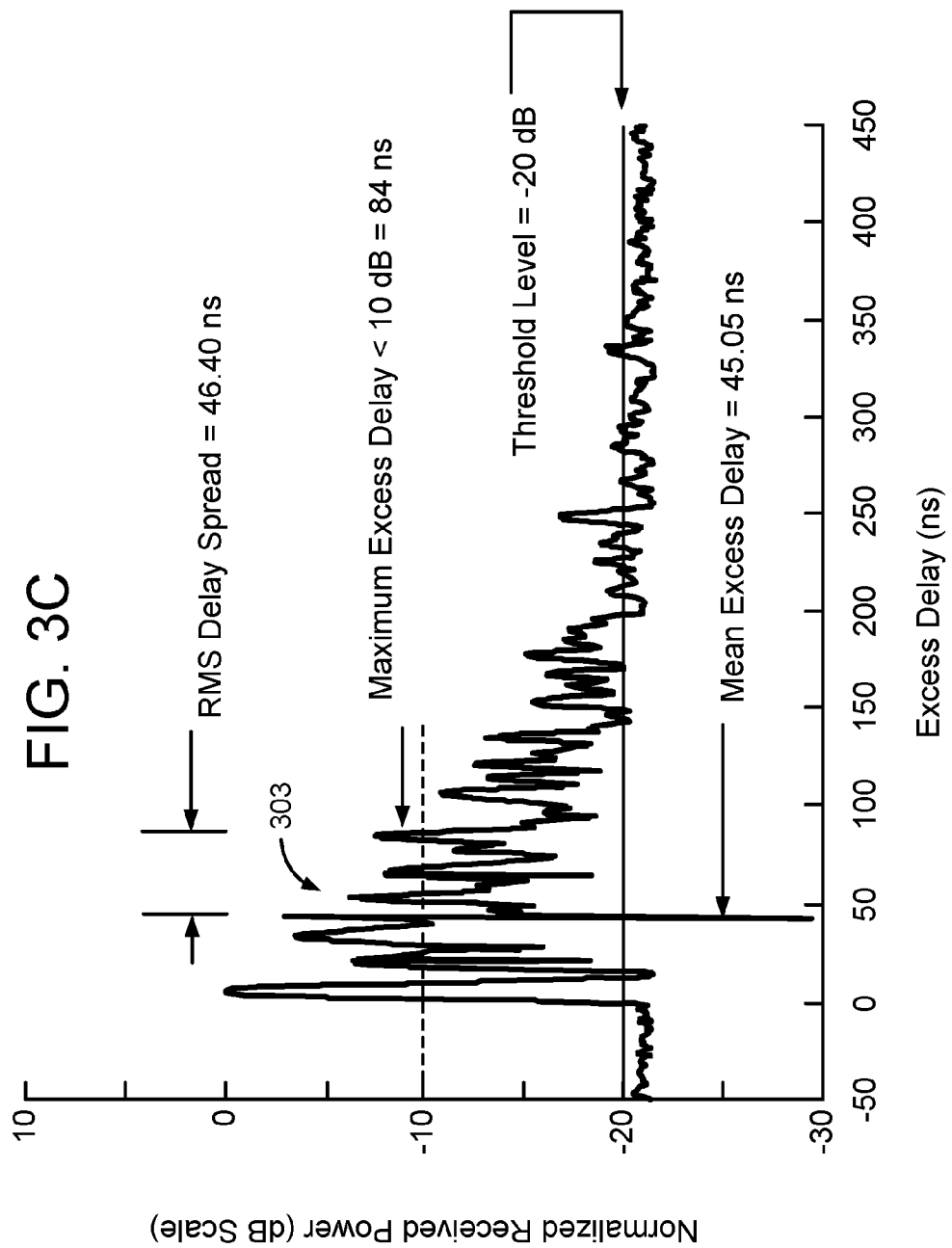

POWER DELAY PROFILE BASED INDOOR OUTDOOR DETECTION

CROSS-REFERENCE TO PROVISIONAL APPLICATION

This application claims the benefit of and priority to U.S. Provisional Application No. 62/160,487 filed on May 12, 2015 and entitled "POWER DELAY PROFILE BASED INDOOR OUTDOOR DETECTION", which is incorporated herein by reference in its entirety.

BACKGROUND

This patent application relates to devices and methods for detecting whether a device is indoor or outdoor.

Methods to detect whether a device is indoors versus outdoors have undergone impressive improvements in recent years. However, current approaches have certain weaknesses: many approaches rely on a Global Positioning System (GPS) or Global Navigation Satellite System (GNSS) receiver or a light sensor, which may fail in certain situations. FIG. 1A illustrates a mobile device 110 in which a GPS receiver 111 receives GPS signals 121, 131 from satellites 120, 130, when mobile device 110 is outdoors, such as a farm 101. Mobile device 110 includes an indoor versus outdoor detector 112 (also called an indoor-outdoor (IO) detector) coupled to GPS receiver 111. IO detector 112 may use a drop in confidence or inability to obtain a fix by GPS receiver 111 as a cue to infer that mobile device 110 is indoors, e.g. in a shopping mall 110 as shown in FIG. 1B. However, when mobile device 110 is near a window of a building, IO detector 112 may get a GPS fix although mobile device 110 is indoors, which makes this method unreliable.

The inventors of the current patent application recognize that methods, devices, apparatuses, systems, and computer-readable storage media of the type described below can detect whether a user is indoor or outdoor in a more reliable manner.

SUMMARY

In several embodiments, an IO detector in a mobile device receives input from a modem (also called "modem-supplied input"), determines whether the mobile device is indoor or outdoor based on the modem-supplied input, and stores in memory a binary value to indicate a state of the mobile device (as being indoor or outdoor). The modem-supplied input which is used by the IO detector can be different, depending on the embodiment. In certain embodiments, wherein the mobile device includes a modem of a cell phone, the modem-supplied input includes an estimate of a power delay profile. The power delay profile may be estimated in any manner, e.g. based on an estimation of channel energy of a cellular signal that is received from a base station ("cell tower"), at an antenna of the mobile device.

In some embodiments, an IO detector of the type described herein extracts a feature from the modem-supplied input, and uses the extracted feature with a classifier (which is trained ahead of time), to output the binary value of indoor/outdoor state and in some embodiments a probability of the state. In certain embodiments, the feature is extracted to characterize temporal distribution of the wireless signal received at the receiver, after multiple propagation delays due to travel along multiple paths in a multipath channel. Examples of a feature that may be extracted include a first moment of the power delay profile, a second central moment of the power delay profile, temporal distance between peaks in the power delay profile, or number of peaks within a predetermined temporal distance in the power delay profile. Depending on the embodiment, multiple such features may be extracted and used (e.g. as a vector) with the classifier, to determine the binary value of indoor/outdoor state of the mobile device.

In some embodiments, logic (also called "state decision logic") in the IO detector compares an empirically-determined threshold, against a probability estimated by use of the classifier, and when the threshold is exceeded the classifier-supplied state is output by the state decision logic, as the indoor/outdoor state of the mobile device. In other embodiments, a classifier in the IO detector outputs a likelihood of the feature being extracted when the mobile device is indoor (or outdoor), and the likelihood is used by the state decision logic in combination with a prior value of the state, to output the binary value of indoor/outdoor state of the mobile device. Specifically, the prior value of the state may be input in some embodiments to an additional classifier that models at least a probability of transition, from the prior value to the binary value of indoor/outdoor state. An output of the additional classifier may be multiplied with the likelihood, to obtain a probability of the mobile device being in the state indicated by the binary value, and this probability is compared with the empirically-determined threshold, to select the binary value of the state as one of indoor or outdoor which is output, and stored in memory.

Depending on the embodiment, a state decision logic as described herein may optionally receive one or more signals from one or more other sensors, such as GPS receiver and/or wireless receiver and/or light sensor, and/or accelerometer and/or magnetometer and/or gyroscope. In other embodiments, a classifier in the IO detector outputs the indoor/outdoor state of the mobile device directly (without probability).

It is to be understood that several other aspects of the embodiments will become readily apparent to those skilled in the art from the description herein, wherein it is shown and described in various aspects, by way of illustration. The drawings and detailed description below are to be regarded as illustrative in nature and not as restrictive.

BRIEF DESCRIPTION OF DRAWINGS

FIGS. 2C and 2D illustrate in a system-level drawing, certain components in two embodiments respectively, of the mobile device of FIG. 2A.

FIG. 2F illustrates, in a high-level flow chart, operations performed by one or more processors in some illustrative embodiments.

FIG. 3C illustrates examples of three features which characterize temporal distribution of a wireless signal.

DETAILED DESCRIPTION

Figure 1A:
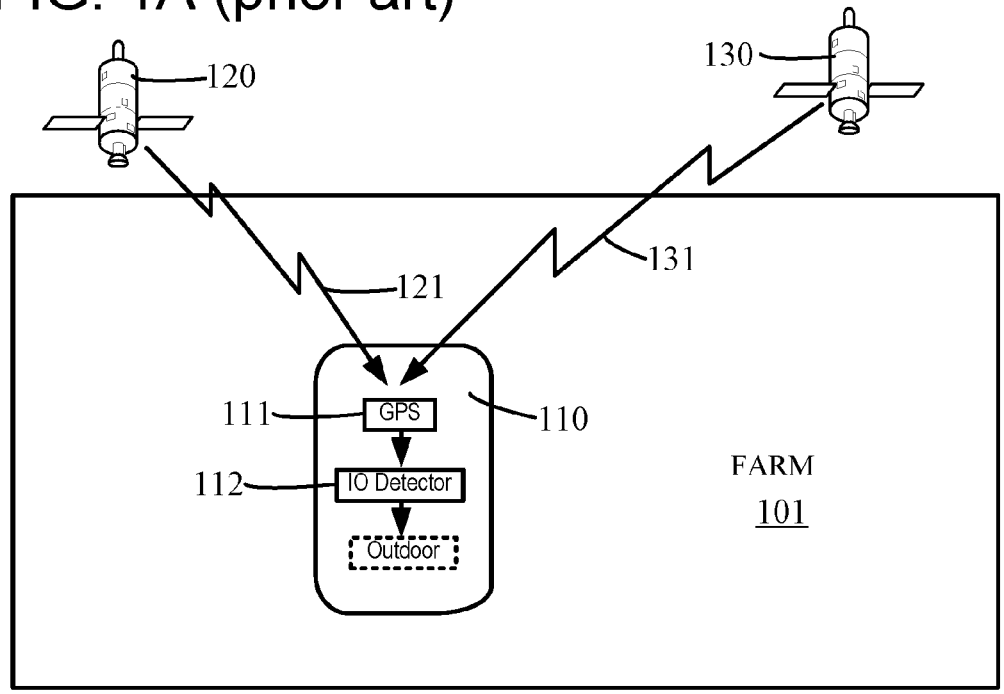
FIG. 1A illustrates a mobile device of prior art that uses a GPS receiver to determine state as being outdoor.
Figure 1B:
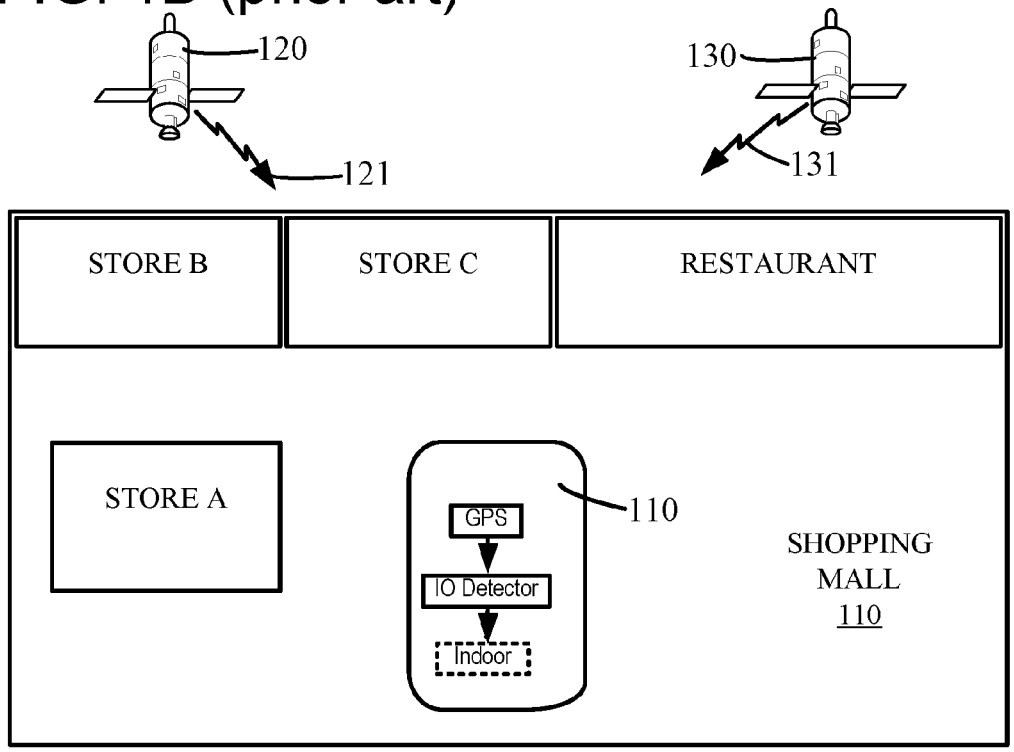
FIG. 1B illustrates the mobile device of FIG. 1A determining the state as being indoor.

Unless expressly stated otherwise, reference numerals identical to one another in the attached drawings of FIGS. 2A-2F, 4, 5A-5B and 6 refer to components that operate similar or identical to one another, as readily apparent to a skilled artisan in view of the description below.

Figure 2A:
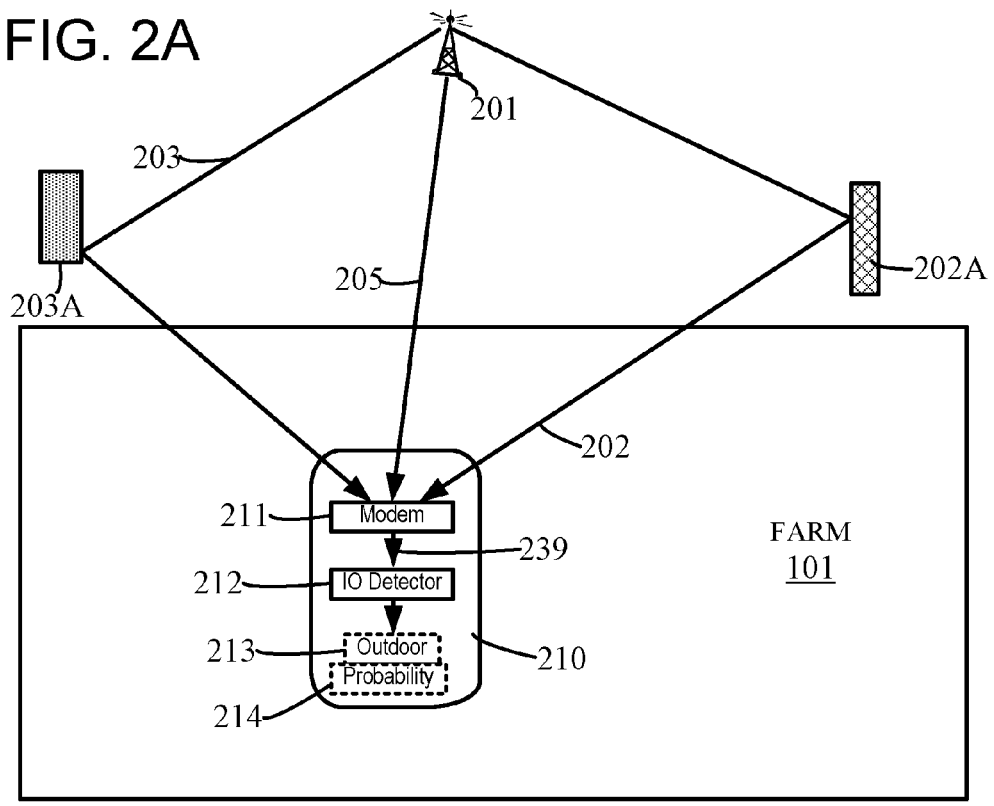
FIG. 2A illustrates a mobile device of several described embodiments that uses a modem-supplied signal to determine state as being outdoor.

Inventors of the current patent application believe that a characteristic of a wireless signal received by a modem in a mobile device can be used to determine at least partially, whether the mobile device is indoors or outdoors. Specifically, as illustrated in FIG. 2A, a modem 211 in a mobile device 210 may receive a cellular signal transmitted from a single base station 201 via different paths, such as paths 202, 203 and/or 205. Path 205 is a direct path between base station 201 and mobile device 210, while paths 203 and 202 arrive at mobile device 210 after reflection by objects 203A and 202A respectively. A first component of the wireless signal that is sensed in modem 211 arrives via path 205, and its arrival time is an earliest time of arrival (TOA). Arrival of the first component is followed by a second component arriving at modem 211 via path 203 from base station 201, and similarly a third component arriving via path 202. In FIG. 2A, mobile device 210 is outside any buildings, and therefore one or more characteristics of the cellular signal are different relative to FIG. 2B wherein mobile device 210 is inside shopping mall 110. Specifically, in FIG. 2B, modem 211 receives a cellular signal from the single base station 201 via other paths, such as paths 224, 225 and/or 223. In this situation also, a first component of the wireless signal that is sensed in modem 211 arrives via path 224, and its arrival time is therefore an earliest time of arrival (TOA), followed by a second component arriving via path 225 and a third component arriving via path 223. Distances of reflectors 223A and 225A from mobile device 210 in shopping mall 110 (FIG. 2B) can be several times smaller when compared to distances of objects 203A and 202A from mobile device 210 in farm 101 (FIG. 2A). Accordingly, one or more characteristic(s) of a cellular signal (e.g. difference between times of arrivals of later-arriving components relative to time of arrival of the first component) as sensed by modem 211 in shopping mall 110 are different from the same characteristic(s) sensed by modem 211 in farm 101.

Figure 2B:
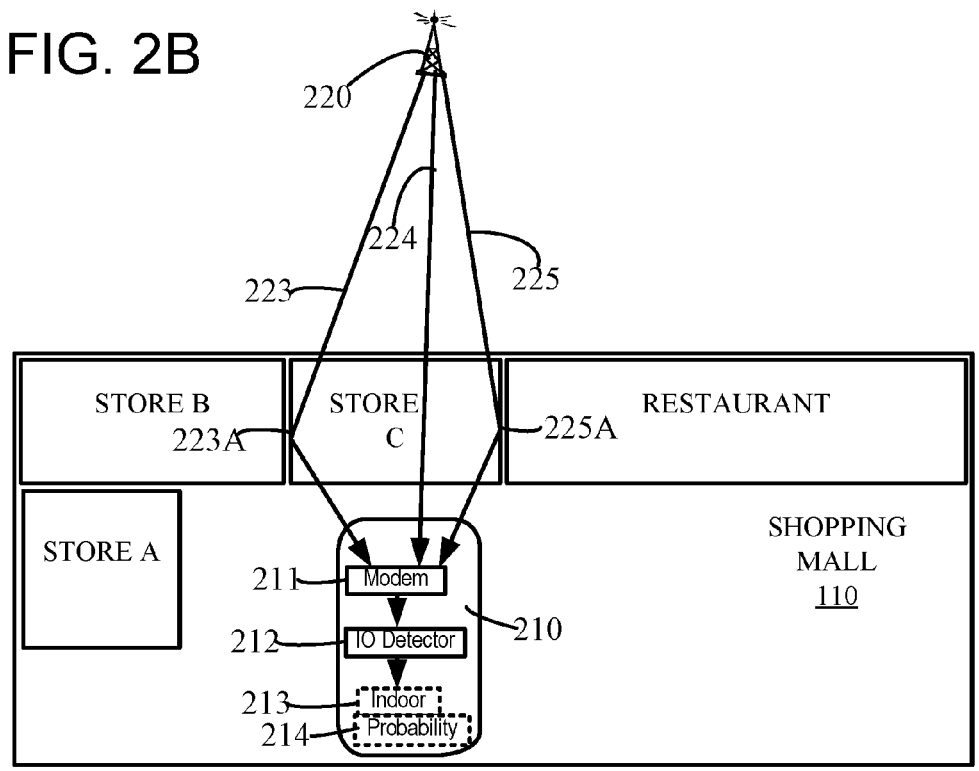
FIG. 2B illustrates the mobile device of FIG. 2A determining the state as being indoor.

Hence, in several embodiments of mobile device 210, based on a cellular signal's characteristics, modem 211 supplies input 239 (FIG. 2A) to IO detector 212 which uses the modem-supplied input 239 to determine whether mobile device 210 is indoor or outdoor. After determination, IO detector 212 stores at a storage location, for example a specific location 213 in a memory in mobile device 210, a binary value to indicate an indoor/outdoor state of mobile device 210. For example, the memory location 213 may store the binary value 1 indicative of the state being indoor when mobile device 210 is inside any building as illustrated in FIG. 2B, and alternatively memory location 213 may store the binary value 0 indicative of the state being outdoor when mobile device 210 is outside any building as illustrated in FIG. 2A. Certain embodiments optionally store in another location 214 in memory of mobile device 210, a probability of the just-described indoor/outdoor state, e.g. a real value within the range 0 and 1, to indicate confidence of correctness.

A state of mobile device 210 being indoor is independent of any particular building in which mobile device 210 may be located. To elaborate, the state of mobile device 210 is indoor, regardless of whether mobile device 210 is located inside one building in one part of the world or mobile device 210 is located inside another building in another part of the world. Hence, there is no change in the state of mobile device 210 being indoor, even when mobile device 210 is moved from one building to another building via an enclosed passage there between.

Modem-supplied input 239 which is used by IO detector 212 (FIG. 2A) can be different, depending on the embodiment. In certain embodiments, modem 211 in mobile device 210 includes therein, circuitry of a receiver in a cell phone, and in these embodiments modem-supplied input 239 (FIG. 2A) includes an estimate of a power delay profile which is generated by the receiver. In some embodiments, a receiver of a cellular signal in a cell phone modem 211 generates a power delay profile, and the power delay profile is provided as modem-supplied input 239, to IO detector 212.

As illustrated in FIG. 2C, a power delay profile may be generated in a module 237 (also called "power delay profile module") of a channel estimator 236. Channel estimator 236 may be implemented in any normal manner, e.g. based on a frequency-domain signal that is output by a Fast Fourier Transform (FFT) circuit 233 in receiver 221. FFT circuit 233 (FIG. 2C) receives a synchronized digital signal that is generated by a synchronizer 232 in receiver 221. FFT circuit 233 extracts frequency domain components from the input signal. Synchronizer 232 in turn receives a digital signal output by an analog-to-digital (A/D) converter and Automatic Gain Control (AGC) that converts a cellular signal received at antenna 221A from base station 201 and controls gain thereof. Synchronizer 232 establishes a timing window, for sampling subcarriers with correct timing. The frequency-domain signal output by FFT circuit 233 is provided to a demodulator 234 which in turn drives a decoder 235 that generates data 2380 that is output by modem 211.

Receiver 221 (FIG. 2C) may be implemented in any manner, e.g. as described in US Patent Application 2009/0245333 entitled "METHODS AND APPARATUS FOR ADAPTING CHANNEL ESTIMATION IN A COMMUNICATION SYSTEM" by Krishnamoorthi, et al that is incorporated by reference herein in its entirety. In addition to receiver 221, modem 211 includes a transmitter 222 that is coupled to antenna 221A to transmit thereon data 2381 that is input to modem 211.

In some embodiments, IO detector 212 (FIG. 2C) includes a feature extractor 241 that extracts one or more feature(s) 244 from the modem-supplied input 239, and supplies the extracted feature(s) 244 to a classifier 242 in IO detector 212. The specific feature(s) 244 that may be extracted by feature extractor 241 can be different, depending on the embodiment. In certain embodiments, the feature(s) 244 extracted by feature extractor 241 is/are indicative of spikiness of the power delay profile, e.g. temporal distance of peaks relative to one another in the power delay profile, and/or number of peaks within a specific temporal distance in the power delay profile (which number, in turn, may be determined by variance or standard deviation relative to local maxima). Hence, the feature which is extracted is capable of distinguishing (e.g. when the feature is further processed) multiple propagation delays due to travel of multiple components of a wireless signal, which is transmitted by a single base station, along multiple paths in a multipath channel.

Figure 3A:
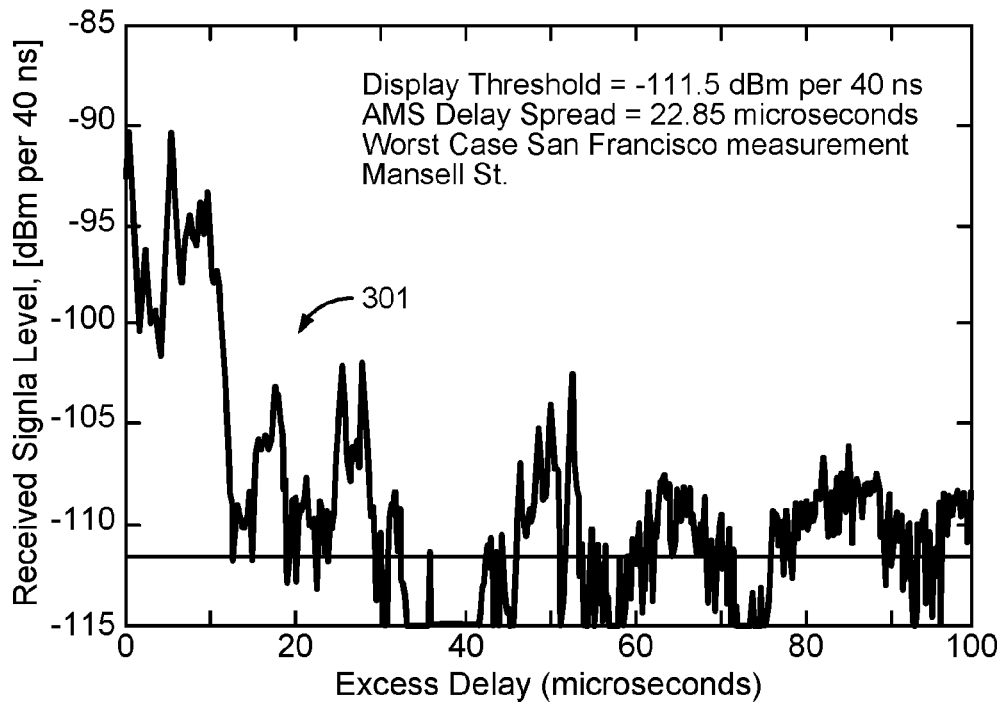
FIGS. 3A and 3B illustrate example power delay profiles at an outdoor location and an indoor location respectively.
Figure 3B:
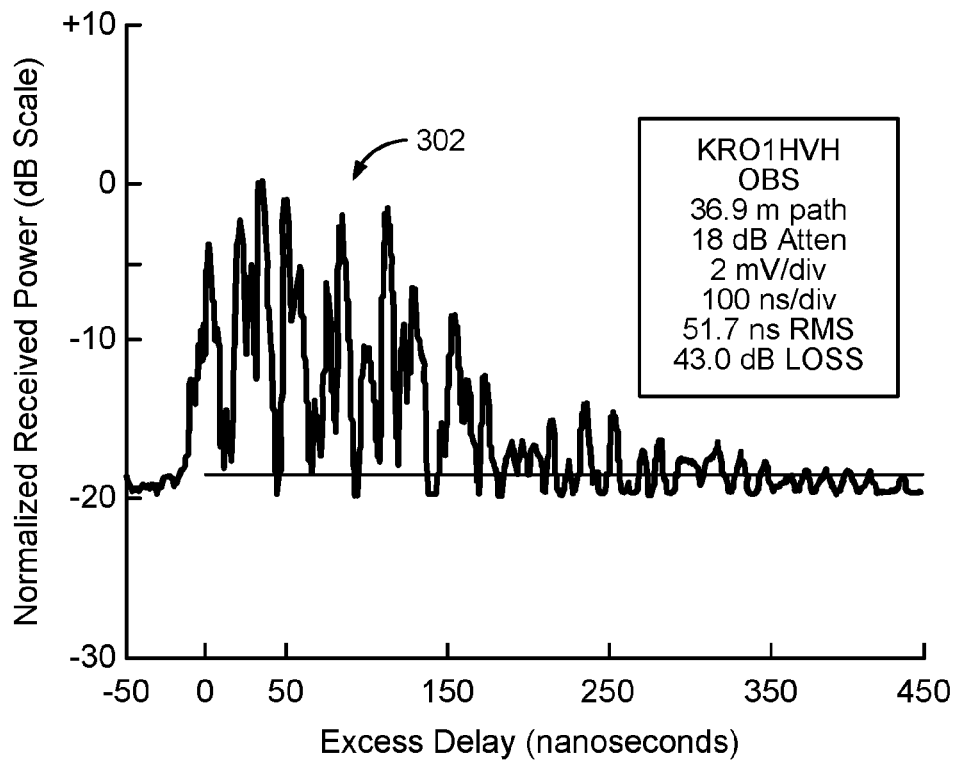
Figure 4:
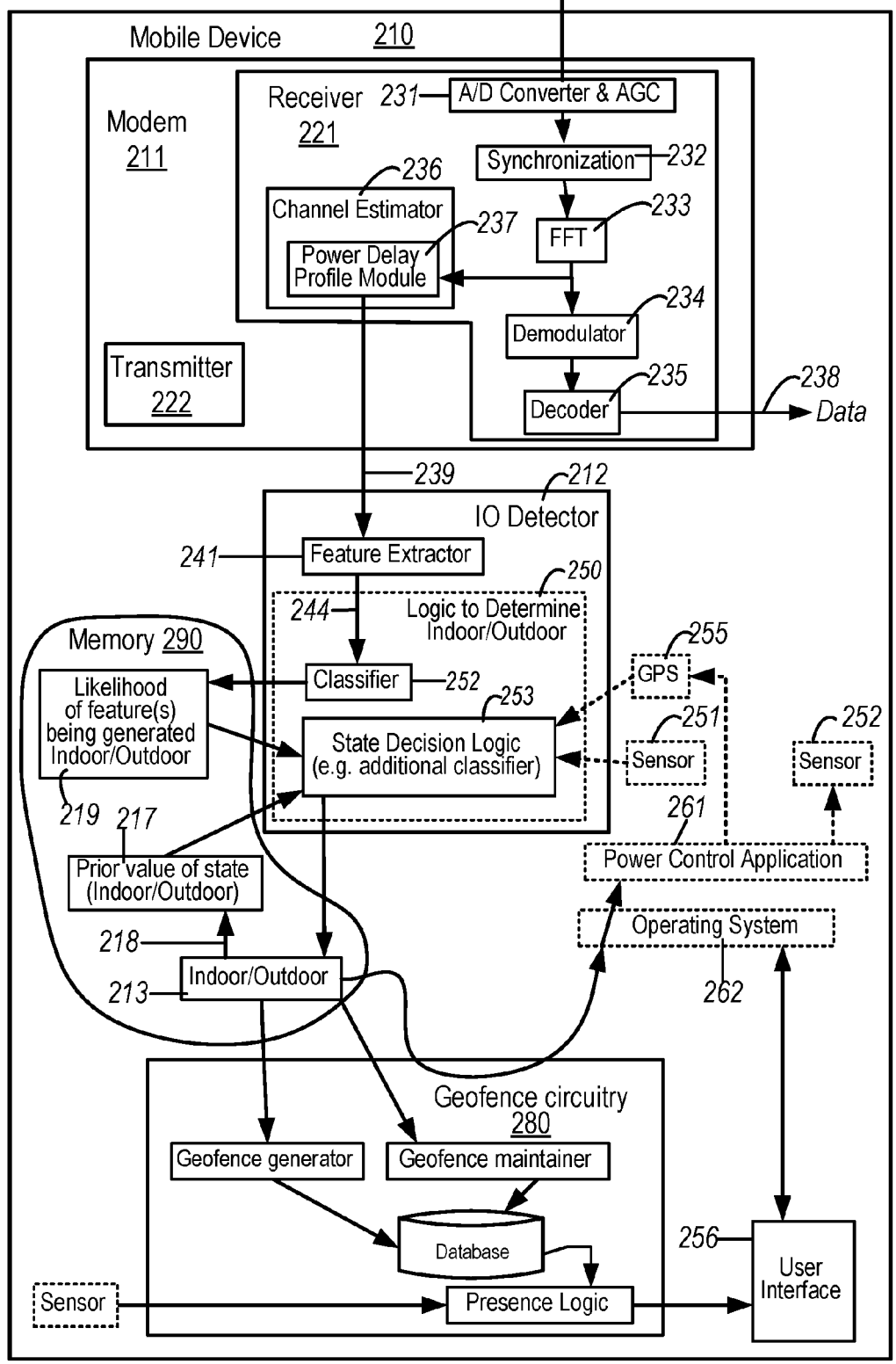
FIG. 4 illustrates, in a system-level drawing, certain components in another embodiment of the mobile device of FIG. 2A.

Other embodiments of feature extractor 241 (FIG. 2C) may extract, from the power delay profile, other feature(s) 244 such as for example root-mean-square (RMS) delay spread, and/or maximum excess delay and/or mean excess delay. See FIG. 3C. The specific feature(s) 244 of power delay profile which is/are extracted by feature extractor 241 may be selected by a human designer of mobile device 210, based on experimentally-determined correlations between certain values of the specific feature(s) at outdoor locations (e.g. as illustrated in FIG. 3A) as being distinctive, relative to other values of the specific feature at indoor locations (as illustrated in FIG. 3B).

For example, assume that a single feature is used in classifier 242, and in this case when feature extractor 241 determines an RMS delay spread of 1 microsecond or greater, classifier 242 may determine that mobile device 210 is outdoor. In the just-described example, when feature extractor 241 determines the RMS delay spread is less than 1 microsecond, classifier 242 may determine that mobile device 210 is indoor. In some embodiments, feature extractor 241 is designed to extract multiple features to form a feature vector, and classifier 242 is trained (in a block 276 shown in FIG. 2E) to use each of the multiple features, to classify a binary state of mobile device 210 being outdoor or indoor. In one such example, a first feature and a second feature are extracted. The first feature characterizes a temporal distribution of the wireless signal received at the receiver 221 of the mobile device 210, where the first feature is capable of distinguishing multiple propagation delays due to travel of the wireless signal along multiple paths in a multipath channel. The second feature can be extracted from the power delay profile of the wireless signal. The classifier can use both the first and second features when determining whether the mobile device is indoor or outdoor. In another such example, a feature vector includes the three features described in the first sentence of the previous paragraph above, and classifier 242 is designed to classify mobile device 210 as being indoor when RMS delay spread is less than 1 microsecond, and maximum excess delay is less than 1 microsecond, and mean excess delay is less than 1 microsecond. When any one of the just-described three conditions is not met, classifier 242 may be designed to classify mobile device 210 as being outdoor.

In first illustrative embodiments, feature extractor 241 (FIG. 2C) extracts as a feature 244, a first moment μ of the power delay profile (also called "mean delay spread") as follows:

$$\mu = \frac{\sum_k P(\tau_k)\tau_k}{\sum_k P(\tau_k)} \text{ (where } P(\tau_k) \text{ is power at delay } \tau_k\text{).}$$

More specifically, in some embodiments, P(τ) is the power at delay τ (also called excess delay) relative to an earliest time of arrival (TOA) of a component of the wireless signal as received at receiver 221 in cell phone modem 211.

In second illustrative embodiments, feature extractor 241 (FIG. 2C) extracts as a feature 244, a second central moment of the power delay profile as follows:

$$\sigma = \sqrt{\frac{\sum_k P(\tau_k)\tau_k^2}{\sum_k P(\tau_k)} - \left(\frac{\sum_k P(\tau_k)\tau_k}{\sum_k P(\tau_k)}\right)^2}$$

In other illustrative embodiments, two or more of the above-described features 244 (FIG. 2C) are used in combination with one another, e.g. in the form of a feature vector, as will be readily apparent in view of this detailed description. Still other embodiments, when extracting a feature 244 in feature extractor 241, may use any one or more of: number of power peaks, and/or autocorrelation, and/or FFT transform. The FFT transform may be used to identify an item in the frequency domain that represents a repeatedly occurring characteristic in the time domain, for extraction as feature 244. In some embodiments, detection of power peaks may use any algorithm available in the art, as will be readily apparent to a skilled artisan in view of this detailed description. Some embodiments may use autocorrelation, which is computed on a vector using the following formula, for example, as in conventional signal analysis. Autocorrelation of P(τ).

$$R(l) = \sum_{i=1}^{N-l}(P(i)-\bar{P})\cdot(P(i+l)-\bar{P})$$

Where $\bar{P}$ is the mean of the vector P(τ) which has length N.

$$\bar{P} = \frac{1}{N}\sum_{\tau=1}^{N} P(\tau)$$

The input to the classifier is the vector R of length N made up with the values R(l) computed for 1≤l≤N.
FFT transform of P(τ).

$$Q(f) = \sum_{\tau=1}^{N} P(\tau)\cdot e^{-2i\pi\frac{f\tau}{N}}$$

The input to the classifier is the vector Q of length N made up of the values Q(f) computed for 1≤f≤N.

Classifier 242 (FIG. 2C) in IO detector 212 uses the feature(s) 244 that is/are supplied by feature extractor 241 to generate a state, and depending on the embodiment optionally a probability of correctness of the state. In embodiments of the type illustrated in FIG. 2D, which generate only state without generation of probability (also called "state-only embodiments"), classifier 242 may be implemented in various ways, e.g. using a decision tree and/or random forest, and a binary value of state output thereof may be stored in memory location 213 in memory 290. In embodiments of the type illustrated in FIG. 2C, which generate probability in addition to state (also called "probabilistic embodiments"), two outputs of classifier 242 are stored in memory locations 216 and 214, and input to logic 243 (also called "state decision logic") which in turn writes the binary value of state to memory location 213. Probabilistic embodiments of classifier 242 (FIG. 2C) may be implemented differently in different embodiments, to include one or more of: Gaussian mixture models, Bayesian inference, Bayesian networks, Neural networks, Linear Regression, Support Vector Machines.

In probabilistic embodiments, training data 264 (e.g. a sequence of labels "Indoor, Indoor, . . . Outdoor" depending on a state of mobile device 210 being indoor or outdoor) received from user interface 256 (via operating system 262) is used to train classifier 242, 245 (see FIGS. 2C and 2D) ahead of time in block 276 (FIG. 2E), which is performed prior to normal operation of mobile device 210 in method 270 (described below). More specifically, during training in block 276, a user provides data 264 via user interface 256 to identify the binary value of outdoors when mobile device 210 is located outdoors. And, the user provides data 264 via user interface 256 to identify an inverse of the just-described binary value, to indicate indoors when mobile device 210 is located indoors. The just-described user-provided data is input as training data, to the classifier of block 273 (described below, in reference to FIG. 2E).

A user's identification of the state of mobile device 210 during training block 276 is done independent of whether mobile device 210 is within a line of sight (LOS) or not within line of sight (NLOS) to base station 201. For example, when device 210 happens to be inside a building, even when located adjacent to a window of the building and present within a line of sight (LOS) to base station 201, user must still provide data 264 to indicate the state of mobile device 210 as "Indoor". Hence, user's identification of the state of mobile device 210 as being "Indoor" or "Outdoor" during training block 276 depends on whether mobile device 210 is at an indoor location enclosed in a building, or at an outdoor location which is outside of any building. Accordingly, depending on the feature(s) being used (which distinguish multiple propagation delays), classifier 245 may be trained during block 276 to distinguish between indoor locations at which receipt of power decreases relatively quickly (e.g. in less than 1 microsecond) and/or has numerous peaks temporally close to one another caused by reflectors located relatively nearby, versus outdoor locations at which receipt of power decreases relatively slowly (e.g. in greater than 1 microsecond) and/or has few peaks temporally far from one another due to reflectors located relatively far away.

In probabilistic embodiments, state decision logic 243 (FIG. 2C) in IO detector 212 compares an empirically-determined threshold, against probability in memory location 214 that is output by classifier 242, and when the threshold is exceeded an intermediate state stored in memory location 216 is output by IO detector 212, at memory location 213 as the state of mobile device 210 being indoor or outdoor. Thus, classifier 242 and state decision logic 243 (FIG. 2C) or classifier 245 (FIG. 2D) may be included in a logic to determine indoor/outdoor 250 in IO detector 212. Depending on the embodiment, logic to determine indoor/outdoor 250 may be implemented in hardware, or alternatively in software executing in one or more processor(s) 406 (see FIG. 2D), or any combination thereof. Similarly, depending on the embodiment, feature extractor 241 may be implemented in hardware, or alternatively in software executing in one or more processor(s) 406 (see FIG. 2D), or any combination thereof.

Also depending on the embodiment, state decision logic 243 (FIG. 2C) may optionally receive one or more signals from one or more other sensors, such as GPS receiver 255 and/or any other sensor 251 which may be, for example a light sensor, and/or accelerometer and/or magnetometer and/or gyroscope. Instead of, or in addition to sensor(s) 251 and/or 255, IO detector 212 of the type shown in FIG. 2C may receive a signal from a wireless receiver, which may be included e.g. in a WiFi adapter (not shown).

In some embodiments, the state output by IO detector 212 in memory location 213 is supplied to a geofence circuit 280 (see FIGS. 2C and 2D). Geofence circuit 280 in turn makes the state in memory location 213 available, via an operating system 262, to one or more applications, such as a power control application 261. Power control application 261 in turn may use the state to turn off certain sensors and/or turn on other sensors. For example, power control application 261 may turn off GPS receiver 255 when the state has a binary value that is indicative of indoors. Additionally, or alternatively, power control application 261 may turn on a wireless receiver (not shown) in mobile device 210, when the state has the binary value indicative of indoors. Moreover, operating system 262 may display on a home screen of mobile device 210, a first set of apps when the state has the binary value indicative of indoors, and a second set of apps when the state has the binary value indicative of outdoors.

Certain embodiments of an application in mobile device 210 use the state in memory location 213 to turn on/off various sensors, e.g. as described in US Patent Publication 2014/0179298 by Grokop et al. entitled "Low Power Always-On Determination of Indoor versus Outdoor State" which is incorporated by reference herein in its entirety.

Figure 2E:
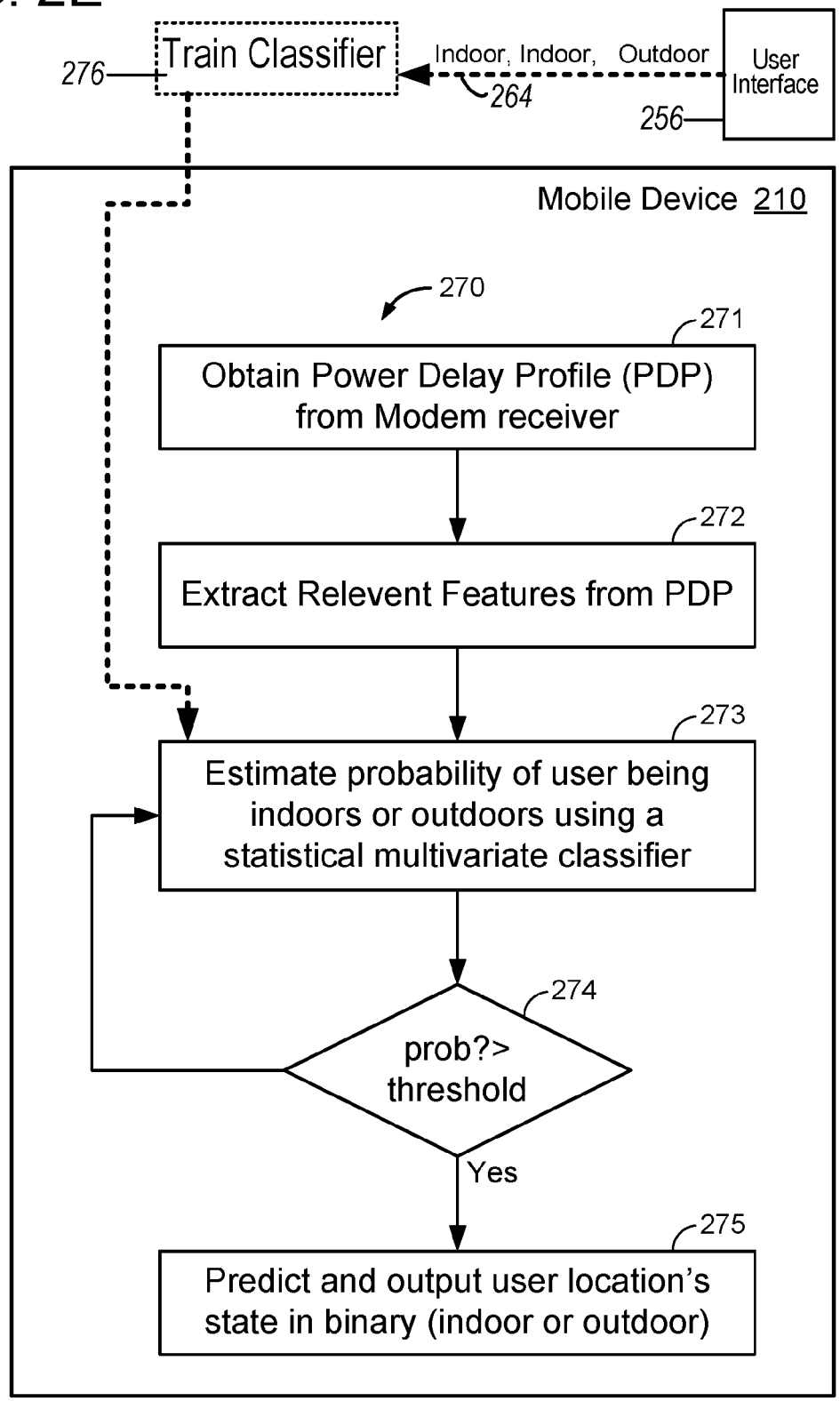
FIG. 2E illustrates, in a flow chart, certain operations that are performed by one or more processors in the mobile device of FIG. 2A.

In several embodiments, after training of classifier 242, 245 in block 276, mobile device 210 is configured to perform method 270 which includes blocks 271-275 as illustrated in FIG. 2E. Specifically, in block 271 (FIG. 2E), mobile device 210 obtains a power delay profile 301, 302 or 303 (see FIGS. 3A-3C) from modem supplied input 239 generated by a modem receiver of a cell phone, such as receiver 221 (FIGS. 2C, 2D). Subsequently, in block 272 (FIG. 2E), mobile device 210 extracts one or more features 244 from the power delay profile, e.g. in feature extractor 241 (FIGS. 2C, 2D). The one or more features extracted can include a feature to characterize temporal distribution of the wireless signal received at the receiver. The one or more features can be capable of distinguishing multiple propagation delays due to travel along multiple paths in a multipath channel. The temporal distribution can be related to whether a mobile device 210 is indoor (see profile 302 in FIG. 3B) or outdoor (see profile 301 in FIG. 3A), and the features can characterize the distribution, as will be discussed further below. Thereafter, in block 273 (FIG. 2E), mobile device 210 determines a binary state indicative of whether a user is indoors or outdoors and estimates probability for the determination, using a classifier (e.g. classifier 242 of FIG. 2C), which may be a statistical multivariate classifier. Subsequently, in an block 274, mobile device 210 checks if a predetermined threshold is exceeded by the probability estimated in block 273, e.g. in logic 243 (FIG. 2C). When the answer in block 274 is no, mobile device 210 returns to block 273 (described above). When the answer in block 274 is yes, mobile device 210 goes to block 275. In block 275, outputs the binary state indicative of the user's location, which was determined in block 273.

Alternative embodiments use as modem-supplied inputs of the IO detector, other characteristics of one or more wireless signal(s) received by a modem in a mobile device that change over time during receipt of the signal(s). Received signal strength indicator (RSSI) does not change when the mobile device is stationary, and thus RSSI is not used by certain embodiments of feature extractor 241 to extract feature(s) 244. Similarly, signals from number of wireless access points detected in a wireless local area network (LAN) adapter also do not change when the mobile device is stationary, and hence this number is also not used by some embodiments of feature extractor 241 to extract feature(s) 244. So, alternative embodiments may extract from one or more modem-supplied inputs of the IO detector, one or more alternative feature(s) that characterize temporal distribution of any wireless signal as that wireless signal changes during its receipt, and use the alternative feature(s) in the manner similar or identical to the description herein, to determine a binary value of a state of the mobile device being indoor or outdoor.

Depending on the embodiment, the feature being extracted may be indicative of an impulse response of a wireless signal transmitted by base station 201, as received at receiver 221 in mobile device 210. Specifically, the impulse response at receiver 221 characterizes temporal distribution of an impulse transmitted by base station 201. Such an impulse response depends on characteristics of the multipath channel (e.g. location of reflectors in paths), but is independent of data 238D (see FIGS. 2C, 2D) carried by the wireless signal. Thus, a feature which is extracted by feature extractor 241 of some embodiments is indicative of whether an outdoor multipath channel is being used in which case reflectors located outdoors are several times farther away (e.g. FIG. 2A) relative to reflectors in an indoor multipath channel used when mobile device 210 is located indoors (e.g. FIG. 2B), and hence the temporal distribution of the wireless signal received at the receiver differs if the mobile device is located indoors (see profile 302 in FIG. 3B) versus outdoors (see profile 301 in FIG. 3A).

In several embodiments, mobile device 210 is configured to perform method 285 which includes blocks 281-284 as illustrated in FIG. 2F. Specifically, in block 281 (FIG. 2F), mobile device 210 obtains a power delay profile of a wireless signal, such as one of profiles 301, 302 or 303 (see FIGS. 3A-3C), from modem supplied input 239 generated by a receiver for a wireless signal in a cell phone, such as receiver 221 (FIGS. 2C, 2D). In some such embodiments, a processor 406 (FIG. 6) in mobile device 210 is coupled to receiver 221 by circuitry (e.g. conductive wires and/or latching gates or flip-flops) to receive modem-supplied input 239 (as illustrated in FIG. 2C), and the just-described circuitry implements block 281 of FIG. 2F, in one example, as a means for obtaining.

Subsequently, in block 282 (FIG. 2F), mobile device 210 extracts a feature 244 from the power delay profile, e.g. in feature extractor 241 (FIGS. 2C, 2D). In certain such embodiments, the feature characterizes temporal distribution of the wireless signal received at the receiver 221. The receiver is capable of detecting multiple propagation delays due to travel of multiple components of the wireless signal along multiple paths in a multipath channel. The temporal distribution is different depending on between whether a mobile device 210 is indoor (see profile 302 in FIG. 3B) or outdoor (see profile 301 in FIG. 3A), and the feature can characterize the distribution. In some such embodiments, a processor 406 (FIG. 6) in mobile device 210 is programmed with software (e.g. feature extractor 241 shown in FIG. 2C) to implement block 282 of FIG. 2F, in one example, as a means for extracting.

Thereafter, in block 283 (FIG. 2F), mobile device 210 determines whether a mobile device of the user is indoor or outdoor using a classifier (e.g. classifier 242 of FIG. 2C), based at least on the feature extracted to characterize the temporal distribution of the wireless signal. In some such embodiments, a processor 406 (FIG. 6) in mobile device 210 is programmed with software (e.g. logic to determine indoor/outdoor 250 shown in FIG. 2C) to implement block 283 of FIG. 2F, in one example, as a means for determining.

In some embodiments of block 283, in addition to the above-described feature (hereinafter first feature), block 283 may include an optional block 283A which uses an additional feature (hereinafter second feature) which is extracted from the power delay profile. In such embodiments, optional block 283A uses the second feature in the classifier in addition to the first feature. Accordingly, a processor 406 (FIG. 6) in mobile device 210 is programmed with software (e.g. in state decision logic 253 shown in FIG. 4) to implement block 283A of FIG. 2F, in one example, as the means for extracting a second feature.

After block 283, in block 284, mobile device 210 stores in memory (e.g. memory 290) a binary value of the state of the location of the mobile device, as being indoor or outdoor (e.g. in location 213), which was determined in block 283. In some such embodiments, a processor 406 (FIG. 6) in mobile device 210 is programmed with software (e.g. in state decision logic 253 shown in FIG. 4) to implement block 284 of FIG. 2F, in one example, as a means for storing.

In some embodiments, a logic to determine indoor/outdoor 250 in IO detector 212 (FIG. 4) uses a prior value of the state being indoor or outdoor, to determine a binary value of state stored in memory location 213 in memory 290. More specifically, IO detector 212 of such embodiments determines the state being indoor or outdoor periodically, i.e. iterates over a delay period 530 (FIG. 5A), e.g. once every millisecond. At the beginning of each iteration, a binary value at memory location 213 is copied to another memory location 217 (as shown by arrow 218 in FIG. 4), for use in the current iteration as a prior value of the state of being indoor or outdoor. Such embodiments may implement an additional classifier (additional classifier not specifically illustrated) to correlate the prior value of the state in memory location 217 and a current value of the state to be determined and stored in location 213. Classifier 520 may model a temporal evolution (e.g. by use of a transition matrix T) such that the longer the delay period 530, the weaker the correlation between the prior and current values of the state, e.g. as illustrated in FIG. 5B for three different values of a parameter $\theta$.

In several such embodiments, logic to determine indoor/outdoor 250 includes a classifier 252 that stores in memory locations 219 (FIG. 4), two likelihood(s) of feature 244 being generated when mobile device 210 is in two corresponding values of the state being indoor or outdoor. At time t, probability of feature $f_t$ being generated when mobile device 210 is indoor is denoted as likelihood $l_t$. Logic to determine indoor/outdoor 250 (FIG. 5A) includes state decision logic 253 that multiplies at least one of the two likelihoods in memory locations 219 with a value obtained by weighting a prior value of the state in memory location 217 with a probability of transitioning from the prior value (e.g. indoor) to an inverse of the prior value (e.g. outdoor) $p_{indoor \rightarrow outdoor}$. The probability of transitioning from a prior value to an inverse of the prior value may be modeled as a function of time (e.g. depending on whether the user is seated and stationary, or whether the user is walking and in motion) in an additional classifier (described elsewhere) included in state decision logic 253.

Figure 5A:
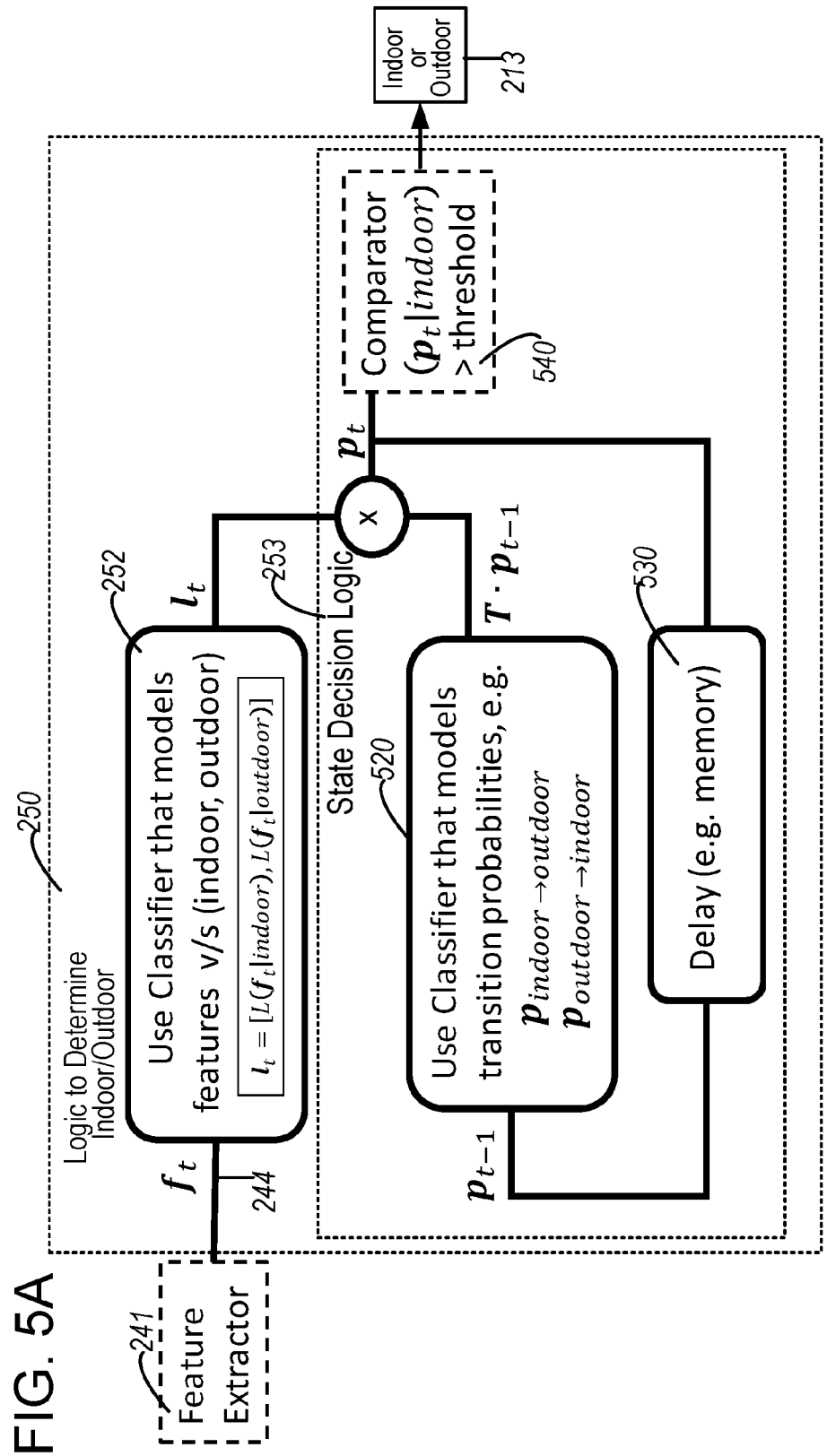
FIG. 5A illustrates, in an intermediate-level drawing, certain components within logic to determine indoor/outdoor 250 of FIG. 4.
Figure 5B:
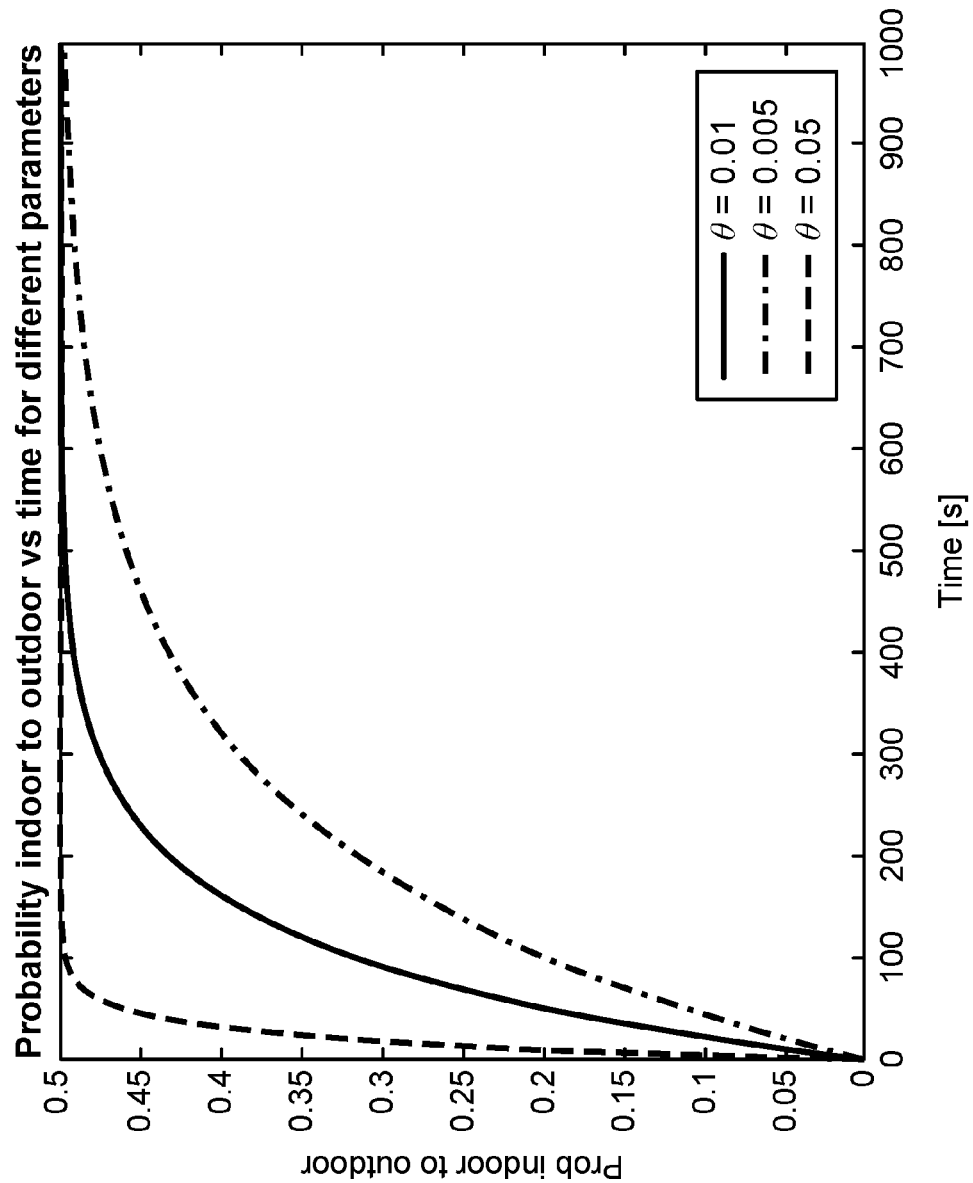
FIG. 5B illustrates, in a graph, a temporal evolution function used in classifier 520 of FIG. 5A, to correlate a prior value of the state of the mobile device of FIG. 2A determined in a prior iteration and a current value of the state which is being computed.

In the embodiment of FIG. 5A, classifier 252 is configured to model a vector 244 (FIG. 4) of k features $f_t$ that are collected by feature extractor 241 from power delay profile 239 (FIG. 4) at time t. As mobile device 210 can be in one of two states $x_i$={indoor, outdoor}, the output of classifier 252 is a vector of likelihoods $l_t$ for each possible state $x_i$, wherein $$l_t=[L(f_t|indoor), L(f_t|outdoor)].$$ 5

In the just-described equation, likelihood functions L are functions learned from previous data that define the probability distribution of the input features f when mobile device 210 is in a certain state, namely one of {indoor, outdoor}. Hence, $l_t$ is a vector of probabilities that the k input features $f_t$ collected at time t, are generated if mobile device 210 is in each possible state. For example, $L(f_t|indoor)$ is the probability that the features have values $f_t$ when mobile device 210 is indoor.

Examples of likelihood functions which may be used in classifier 252 to provide an estimation of probability of being indoor/outdoor include Gaussian mixture models, Bayesian inference, Bayesian networks, Neural networks, Linear Regression, Support Vector Machines. One example of a Gaussian mixture model for probability p of each possible state $x_i$, which is used in classifier 252 is as follows:

$$p(f|x_i) = \sum_{j=1}^{M} \varphi_{i,j} N(\mu_{i,j}, \Sigma_{i,j})$$

where:
- $x_i$ with i={1,2} are the 2 states {indoor, outdoor}
- M are the number of Gaussian components (learned from data)
- $N(\mu, \Sigma)$ are the Gaussian components:

$$N(\mu, \Sigma) = \frac{1}{\sqrt{(2\pi)^k |\Sigma|}} e^{-\frac{1}{2}(f-\mu)^T \Sigma^{-1}(f-\mu)}$$

$\varphi_{i,j}, \mu_{i,j}, \Sigma_{i,j}$ are respectively the weight, the vector of mean and the covariance matrix for each Gaussian component i for each state j (learned from data)

In some embodiments, state decision logic 253 includes an additional classifier 520 (FIG. 5A) that models probabilities of transitioning from indoor to outdoor and vice versa, by use of transition matrix that T defines the probability of changes from each of the two binary values of the state of being indoor or outdoor. The additional classifier 520 (also called second classifier) receives as input the probability $p_{t-1}$ stored in memory as the output of previous iteration at time t-1, and generates product $T \cdot p_{t-1}$. The just-described product is multiplied in state decision logic 253 with likelihood vector $l_t$ of the current iteration output by classifier 252 (also called first classifier), to obtain the current iteration's probability $p_t$ for each state $x_i$ which is then compared with a threshold by comparator 540 which determines a binary value of the state of mobile device 210 as one of {indoor, outdoor}. Hence, in this manner, some embodiments of block 283 (FIG. 2F) of determining obtains a probability $p_t$ of a state indicated by one of values {indoor, outdoor}.represented as a binary value, by multiplying likelihood $l_t$ from classifier 252 with the output of additional classifier 520, namely $T \cdot p_{t-1}$.

In such embodiments, transition matrix T may be learned from data in training in block 276 (FIG. 2E), via statistical analysis. One illustrative example of transition matrix T uses a Markov process as follows. The state of mobile device 210 at time t depends only from a state of mobile device 210 at time t-1 in the previous iteration, as follows $$T = \begin{bmatrix} 1-p_{indoor \to outdoor} & p_{indoor \to outdoor} \\ p_{outdoor \to indoor} & 1-p_{outdoor \to indoor} \end{bmatrix}$$

where $p_{indoor \to outdoor}$ is the probability of mobile device 210 transitioning from the state of value indoor to the state of value outdoor, and where $p_{outdoor \to indoor}$ is the probability of mobile device 210 transitioning from the state of value outdoor to the state of value indoor. Such probabilities and hence matrix T can depend on the difference in time between interactions, for instance $p_{indoor \to outdoor} = 0.5 \cdot (1-e^{-\theta \Delta t})$ Where θ is a parameter that models how fast the probabilities of environment change increase with time. FIG. 5B shows temporal evolution of matrix T for three values of θ namely 0.5, 0.1 and 0.05, and one specific value among these three may be selected for use in an embodiment, with the specific value being identified during training block 276, based on user-provided data.

Figure 6:
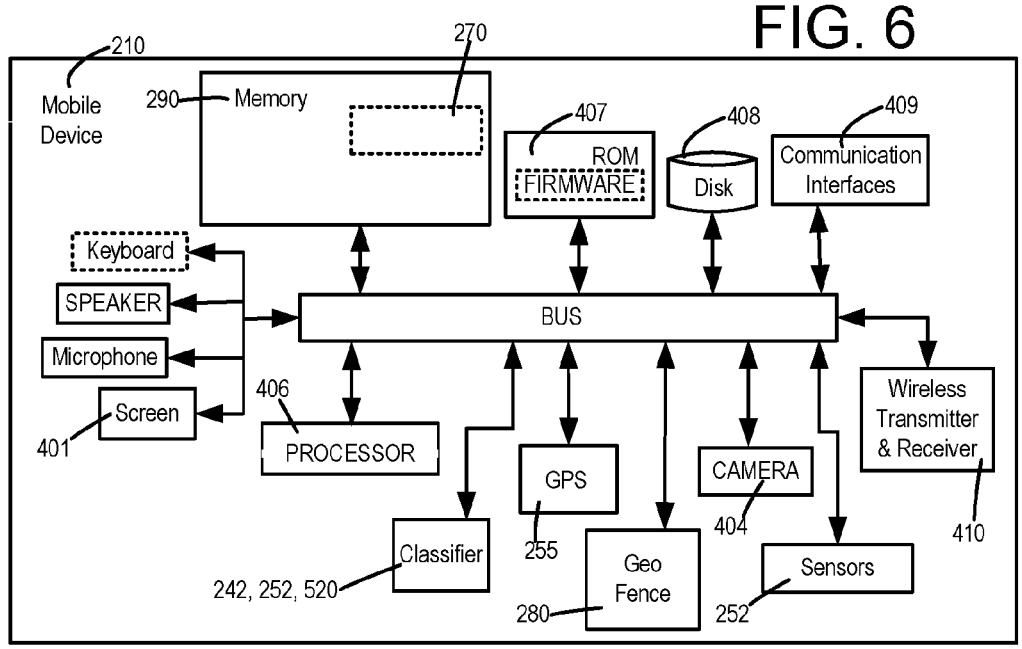
FIG. 6 illustrates circuitry in an example of the mobile device of FIG. 2A, in certain embodiments of the present disclosure.

FIG. 6 provides a schematic illustration of one embodiment of mobile device 210 that can perform the methods provided by various embodiments, as described herein. FIG. 6 is meant only to provide a generalized illustration of certain components of mobile device 210, any and/or all of which may be utilized in certain embodiments as appropriate. FIG. 6 therefore, broadly illustrates how individual system elements may be implemented in a relatively separated or relatively more integrated manner in mobile device 210.

Mobile device 210 includes hardware elements that can be electrically coupled via a bus (or may otherwise be in communication, as appropriate). The hardware elements of mobile device 210 may include one or more processors 406 configured to perform one or more acts and/or blocks and/or operations described above, and may further include without limitation one or more general-purpose processors and/or one or more special-purpose processors (such as digital signal processing chips). Mobile device 210 may further include a classifier 242 (e.g. in the form of a neural network), GPS receiver 255, and geofence circuitry 280.

Mobile device 210 may include one or more input devices, such as touch-sensitive screen 401 and/or a microphone, and/or a speaker, a keyboard and/or the like. Mobile device 210 may also include a camera 404, and white balance setting therein which may be set by an application that uses a value of indoor/outdoor state in memory location 213 (FIG. 2C) e.g., via operating system 262. It should be understood that mobile device 210 may be any portable electronic device such as a cellular or other wireless communication device, personal communication system (PCS) device, personal navigation device (PND), Personal Information Manager (PIM), Personal Digital Assistant (PDA), laptop, camera, smartphone, or other suitable mobile platform that is capable of providing a user interface.

Mobile device 210 may include (and/or be in communication with) one or more non-transitory storage devices 408, which can comprise, without limitation, local and/or network accessible storage, and/or can include, without limitation, a disk drive, a drive array, an optical storage device, a solid-state storage device such as a random access memory ("RAM"). Mobile device 210 may include read-only memory ("ROM") 407, which can be programmable, flash-updateable and/or the like. Such storage devices may be Mobile device 210 may also include a communications interface 409 (e.g. including modem 211 therein) and/or wireless transceiver 410, which can include without limitation a modem, a network card (wireless or wired), an infrared communication device, a wireless communication device and/or chipset (such as an 802.11 device, a WiFi device, a WiMax device, cellular communication facilities, etc.), and/or the like. The communications interface 409 and/or wireless transceiver 410 may permit data to be exchanged with a network (such as the network described below, to name one example), other computer systems, and/or any other devices described herein.

Communication interfaces 409 may interface to various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an Institute of Electrical and Electronics Engineers (IEEE) 802.11x network, and a WPAN may be a Bluetooth network, an IEEE 802.15x, or some other type of network. The techniques may also be used for any combination of WWAN, WLAN and/or WPAN.

The described embodiments may be implemented by wireless transceiver 410 in conjunction with Wi-Fi/WLAN or other wireless networks. In addition to Wi-Fi/WLAN signals, a wireless/mobile device 210 may receive via a receiver therein (e.g. GPS receiver 255), signals from satellites, which may be from a GPS, Galileo, Global Navigation Satellite System (GLONASS), Navigation Satellite Timing and Ranging System (NAVSTAR), QZSS, a system that uses satellites from a combination of these systems, or any satellite positioning system developed in the future, each referred to generally herein as a Satellite Positioning System (SPS) or Global Navigation Satellite System (GNSS). An SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as GPS, Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In many embodiments, mobile device 210 may include a non-transitory working memory 290, which can include a random-access memory (RAM) or read-only (ROM) device, as described above. One or more of the storage devices and/or memory 290 of mobile device 210 may comprise software, to perform acts and/or blocks and/or operations of method 270 shown in FIG. 2E, including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 2E, might be implemented as code and/or instructions executable by mobile device 210 (and/or one or more processor(s) 406 therein); in an aspect, then, such code and/or instructions can be used to configure and/or adapt a general purpose computer (or other device) to perform one or more operations in accordance with the described methods.

A set of these instructions and/or code to perform method 270 (FIG. 2E) might be stored on a computer-readable storage medium, such as the storage device(s) 408 described above. In some cases, the storage medium might be incorporated within a computer system, such as mobile device 210. In other embodiments, the storage medium might be separate from mobile device 210 (e.g., a removable medium, such as a compact disc), and/or provided in an installation package, such that the storage medium can be used to program, configure and/or adapt a general purpose computer with the instructions/code stored thereon. These instructions might take the form of executable code, which is executable by mobile device 210 and/or might take the form of source and/or installable code, which, upon compilation and/or installation on mobile device 210 (e.g., using any of a variety of generally available compilers, installation programs, compression/decompression utilities, etc.) takes the form of executable code.

Substantial variations may be made in accordance with specific requirements. For example, customized hardware might also be used in mobile device 210, and/or particular elements might be implemented in hardware, software (including portable software, such as applets, etc.), or both to perform any of blocks 271-275 illustrated in FIG. 2E. Thus, some embodiments may employ mobile device 210 to perform method 270 (FIG. 2E) in accordance with the disclosure.

For example, some or all of the procedures of the described methods may be performed by mobile device 210 in response to processor(s) 406 executing one or more sequences of one or more instructions (which might be incorporated into an operating system and/or other code, such as an application program) contained in memory 290. Such instructions may be read into the working memory 290 from another computer-readable medium, such as one or more of the storage device(s) 408.

If implemented in firmware and/or software, instructions to perform method 270 may be stored as on one or more non-transitory computer-readable storage media. Examples include non-transitory computer-readable storage media encoded with a data structure and non-transitory computer-readable storage media encoded with a computer program. Non-transitory computer-readable storage media may take the form of an article of manufacture. Non-transitory computer-readable storage media includes any physical computer storage media that can be accessed by a computer. By way of example, and not limitation, such non-transitory computer-readable storage media can comprise SRAM, ROM, EEPROM, CD-ROM or other optical disk storage, magnetic disk storage or other magnetic storage devices, or any other non-transitory medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various forms of computer-readable storage media may be involved in carrying one or more sequences of one or more instructions to the processor(s) 406 for execution. Merely by way of example, the instructions may initially be carried on a magnetic disk and/or optical disc of a remote computer. A remote computer might load the instructions into its dynamic memory and send the instructions as signals over a transmission medium to be received and/or executed by mobile device 210. These signals, which might be in the form of electromagnetic signals, acoustic signals, optical signals and/or the like, are all examples of carrier waves on which instructions can be encoded, in accordance with various embodiments.

Communications interfaces 409 and/or wireless transceiver 410 may receive signals, and the bus then might carry the signals (and/or the data, instructions, etc. carried by the signals) to the working memory 290, from which the processor(s) 406 retrieves and executes the instructions. The instructions received by the memory 290 may optionally be stored on a non-transitory storage device 408 either before or after execution by the processor(s) 406. Memory 290 may contain at least one database according to any of the databases and methods described herein. Memory 290 may thus store any of the values discussed in any of the present disclosures, including an intermediate indoor/outdoor state in memory location 216 and/or probability in memory location 214 and/or indoor/outdoor state in memory location 213 (see FIG. 2C).

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other such embodiments. Rather, the preceding description of the embodiments will provide those skilled in the art with an enabling description for implementing illustrative embodiments. Various changes may be made in the function and arrangement of elements without departing from the spirit and scope of embodiments in this description.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify embodiments described herein. Also, a number of steps may be undertaken before, during, or after the above elements are considered. Accordingly, the above description does not limit the scope of the disclosure.

Various examples have been described. These and other examples are within the scope of the following claims.

The invention claimed is:

1. A method of determining an indoor-outdoor state of a mobile device indicative of whether the mobile device is indoors or outdoors, the method comprising:
    obtaining a power delay profile of a wireless signal from a modem, the modem comprising a receiver for the wireless signal;
    extracting, from the power delay profile, a feature to characterize temporal distribution of the wireless signal received at the receiver, the feature being capable of distinguishing multiple propagation delays due to travel along multiple paths in a multipath channel;
    determining, using a statistical classifier, the indoor-outdoor state of the mobile device, and an associated probability of correctness of the indoor-outdoor state of the mobile device, based at least on the feature extracted to characterize temporal distribution of the wireless signal; and
    storing in memory a binary value to indicate the indoor-outdoor state of the mobile device and storing in the memory the associated probability of correctness of the indoor-outdoor state of the mobile device.

2. The method of claim 1
    wherein the feature extracted to characterize temporal distribution of the wireless signal is at least one of:
    (a) mean delay spread of the power delay profile, computed as $$\mu = \frac{\sum_k P(\tau_k)\tau_k}{\sum_k P(\tau_k)}$$

with P(τ) being the power at delay τ relative to an earliest time of arrival of a component of the wireless signal, at the receiver;
    or
    (b) root mean square of delay spread of the power delay profile computed as $$\sigma = \sqrt{\frac{\sum_k P(\tau_k)\tau_k^2}{\sum_k P(\tau_k)} - \left(\frac{\sum_k P(\tau_k)\tau_k}{\sum_k P(\tau_k)}\right)^2}$$

with $P(\tau)$ being the power at delay $\tau$ relative to an earliest time of arrival of a component of the wireless signal, at the receiver.

3. The method of claim 1 wherein the feature extracted to characterize temporal distribution of the wireless signal comprises at least a predetermined number of peaks within a predetermined temporal distance.

4. The method of claim 1 wherein the feature extracted to characterize temporal distribution of the wireless signal is hereinafter a first feature, and wherein the method further comprises:
 extracting a second feature from the power delay profile;
 wherein the second feature is used in the statistical classifier in addition to the first feature, during the determining; and
 wherein the wireless signal is a cellular signal transmitted by a single base station.

5. The method of claim 1 wherein:
 the determining comprises comparing the associated probability with a threshold.

6. A method of determining a state of a mobile device, the method comprising:
 obtaining a power delay profile of a wireless signal from a modem, the modem comprising a receiver for the wireless signal:
 extracting, from the power delay profile, a feature to characterize temporal distribution of the wireless signal received at the receiver, the feature being capable of distinguishing multiple propagation delays due to travel along multiple paths in a multipath channel;
 determining whether the mobile device is indoor or outdoor based at least on the feature extracted to characterize temporal distribution of the wireless signal; and
 storing in memory, a binary value to indicate the state of the mobile device as being indoor or outdoor, based on the determining;
 wherein the determining uses a prior value of the state being indoor or outdoor.

7. The method of claim 6 wherein:
 the prior value of the state is input to as classifier; and
 the classifier models at least a probability of transition, from the prior value of the state to an inverse of the prior value.

8. The method of claim 1 wherein:
 the statistical classifier outputs two likelihoods of the feature being generated when the mobile device is in two corresponding values of the indoor-outdoor state;
 the determining comprises multiplying at least one of the two likelihoods with an output of an additional classifier; and
 the additional classifier models at least an additional probability of transition, from a prior value of the indoor-outdoor state to an inverse of the prior value.

9. The method of claim 6 wherein the feature extracted to characterize temporal distribution of the wireless signal comprises at least a predetermined number of peaks within a predetermined temporal distance.

10. The method of claim 6 further comprising:
 prior to normal operation, using training data to train a classifier;
 wherein after the training, the classifier is used in the determining.

11. An apparatus comprising:
 an antenna;
 a modem coupled to the antenna, the modem comprising a receiver for a wireless signal received at the antenna, the receiver comprising a channel estimator, the channel estimator comprising a power delay profile module;
 an indoor-outdoor detector comprising a feature extractor, the feature extractor being coupled to the power delay profile module in the channel estimator in the receiver in the modem;
 wherein the indoor-outdoor detector fluffier comprises circuitry to determine, using a statistical classifier, an indoor-outdoor state of the apparatus, and an associated probability of correctness of the indoor-outdoor state of the apparatus, the circuitry being coupled to the feature extractor to receive therefrom a feature extracted to Characterize temporal distribution of power of the wireless signal received at the receiver, the feature being capable of distinguishing multiple propagation delays due to travel along multiple paths in a multipath channel;
 a memory coupled to the indoor-outdoor detector, the memory comprising a first storage location to the indoor-outdoor state of the apparatus and a second storage location to store the associated probability of correctness of the indoor-outdoor state of the apparatus;
 wherein the circuitry comprises a processor coupled to the memory.

12. The apparatus of claim 11 wherein the feature extracted to characterize temporal distribution of power of the wireless signal comprises at least a predetermined number of peaks within a predetermined temporal distance.

13. The apparatus of claim 11 wherein the feature extracted to characterize temporal distribution of power of the wireless signal is hereinafter a first feature, and wherein:
 the circuitry is coupled to the feature extractor to receive therefrom at least a second feature of the power delay profile;
 the second feature is used in the statistical classifier in addition to the first feature; and
 the wireless signal is a cellular signal transmitted by a single base station.

14. An apparatus comprising:
 an antenna;
 a modem coupled to the antenna, the modem comprising a receiver for a wireless signal received at the antenna, the receiver comprising a channel estimator, the channel estimator comprising a power delay profile module;
 an indoor-outdoor detector comprising a feature extractor, the feature extractor being coupled to the power delay profile module in the channel estimator in the receiver in the modem;
 wherein the indoor-outdoor detector further comprises circuitry to determine whether the apparatus is indoor or outdoor, the circuitry being coupled to the feature extractor to receive therefrom a feature extracted to characterize temporal distribution of power of the wireless signal received at the receiver, the feature being capable of distinguishing multiple propagation delays due to travel along multiple paths in a multipath channel;
 a memory coupled to the indoor-outdoor detector, the memory comprising a storage location to store a state of the apparatus as being one of indoor or outdoor;

wherein the state is output by the circuitry, and the circuitry comprises a processor coupled to the memory;
wherein the circuitry is coupled to memory to receive therefrom a prior value of the state being indoor or outdoor.

15. The apparatus of claim 14 wherein the feature extracted to characterize temporal distribution of the wireless signal comprises at least a predetermined number of peaks within a predetermined temporal distance.

16. The apparatus of claim 14 further comprising:
a classifier trained using training data;
wherein after the training, the classifier is used in the determining.

17. A mobile device comprising:
means for obtaining a power delay profile of a wireless signal from a modem, the modem comprising a receiver for the wireless signal;
means for extracting, from the power delay profile, a feature to characterize temporal distribution of power of the wireless signal received at the receiver, the feature being capable of distinguishing multiple propagation delays due to travel along multiple paths in a multipath channel;
means for determining, using a statistical classifier, an indoor-outdoor state of the mobile device, and an associated probability of correctness of the indoor-outdoor state of the mobile device, based at least on the feature extracted to characterize temporal distribution of the wireless signal;
means for storing in memory, a binary value to indicate the indoor-outdoor state of the mobile device, and the associated probability of correctness of the indoor-outdoor state of the mobile device.

18. The mobile device of claim 17 wherein the feature extracted to characterize temporal distribution of the wireless signal comprises at least a predetermined number of peaks within a predetermined temporal distance.

19. The mobile device of claim 17 wherein the feature extracted to characterize temporal distribution of the wireless signal is hereinafter a first feature, and wherein the mobile device further comprises:
means for extracting a second feature from the power delay profile;
wherein the second feature is used in the statistical classifier in addition to the first feature, by the means fix determining; and
wherein the wireless signal is a cellular signal transmitted by a single base station.

20. A mobile device comprising:
means for obtaining a power delay profile of a wireless signal from a modem, the modem comprising a receiver for the wireless signal;
means for extracting, from the power delay profile, a feature to characterize temporal distribution of power of the wireless signal received, at the receiver, the feature being capable of distinguishing multiple propagation delays due to travel along multiple paths in a multipath channel;
means for determining whether the mobile device is indoor or outdoor based at least on the feature extracted to characterize temporal distribution of the wireless signal; and
means for storing in memory, a binary value to indicate the state of the mobile device as being one of indoor or outdoor, wherein the binary value is output by the means for determining;
wherein the means for determining uses a prior value of the state being indoor or outdoor.

21. One or more non-transitory computer-readable storage media comprising instructions, which, when executed by a machine, cause one or more processors therein to:
obtain a power delay profile of a wireless signal from a modem, the modem comprising a receiver for the wireless signal;
extract, from the power delay profile, a feature that characterizes temporal distribution of the wireless signal received at the receiver capable of distinguishing multiple propagation delays due to travel along multiple paths in a multipath channel;
determine, using a statistical classifier, an indoor-outdoor state of a mobile device, and an associated probability of correctness of the indoor-outdoor state of the mobile device, based at least on the feature extracted to characterize temporal distribution of the wireless signal; and
store in memory, a binary value to indicate the indoor-outdoor state of the mobile device, and the associated probability of correctness of the indoor-outdoor state of the mobile device, based on execution of the instructions to determine.

22. The one or more non-transitory computer-readable storage media of claim 21 wherein:
the statistical classifier outputs two likelihoods of the feature being generated when the mobile device is in two corresponding values of the indoor-outdoor state; and
the determining comprises multiplying at least one of the two likelihoods with an output of an additional classifier; and
the additional classifier models at least Rain an additional probability of transition, from a prior value of the indoor-outdoor state to an inverse of the prior value.

23. One or more non-transitory computer-readable storage media comprising instructions, which, when executed by a machine, cause one or more processors therein to:
obtain a power delay profile of a wireless signal from a modem, the modem comprising a receiver for the wireless signal;
extract, from the power delay profile, a feature that characterizes temporal distribution of the wireless signal received at the receiver capable of distinguishing multiple propagation delays due to travel along multiple paths in a multipath channel;
determine whether a mobile device is indoor or outdoor based at least on the feature extracted to characterize temporal distribution of the wireless signal; and
store in memory, a binary value to indicate a state of the mobile device as being one of indoor or outdoor, based on execution of the instructions to determine;
wherein the instructions to de ermine use a prior value of the state being indoor or outdoor.

24. The one or more non-transitory computer-readable storage media claim 23 wherein:
the prior value of the state is input to a classifier; and
the classifier models at least a probability of transition, from the prior value of the state to the binary value stored in memory.

25. The one or more non-transitory computer-readable storage media of claim 23 wherein the feature extracted to characterize temporal distribution of the wireless signal comprises at least a predetermined number of peaks within a predetermined temporal distance.

26. The one or more non-transitory computer-readable storage media of claim 23 further comprising instructions, which, when executed by the machine, cause the one or more processors therein to:
 train a classifier using training data;
 wherein after the training, the classifier is used in the instructions to determine.

\* \* \* \* \*